(12) United States Patent
Clancy et al.

(10) Patent No.: US 8,392,429 B1
(45) Date of Patent: Mar. 5, 2013

(54) INFORMATIONAL BOOK QUERY

(75) Inventors: Daniel J. Clancy, Los Altos, CA (US);
Xuefu Wang, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 558 days.

(21) Appl. No.: 12/324,731

(22) Filed: Nov. 26, 2008

(51) Int. Cl.
*G06F 17/30* (2006.01)

(52) U.S. Cl. ........ 707/748; 707/738; 707/739; 707/740; 707/758; 707/771

(58) Field of Classification Search ............... None
See application file for complete search history.

(56) References Cited

U.S. PATENT DOCUMENTS

| | | | | |
|---|---|---|---|---|
| 5,157,783 | A * | 10/1992 | Anderson et al. | 1/1 |
| 6,285,999 | B1 | 9/2001 | Page | |
| 6,665,659 | B1 * | 12/2003 | Logan | 1/1 |
| 7,124,129 | B2 * | 10/2006 | Bowman et al. | 1/1 |
| 7,257,577 | B2 * | 8/2007 | Fagin et al. | 1/1 |
| 7,783,644 | B1 * | 8/2010 | Petrou et al. | 707/748 |
| 7,831,548 | B1 * | 11/2010 | Round et al. | 707/609 |
| 7,912,829 | B1 * | 3/2011 | Mathes et al. | 707/707 |
| 2003/0195877 | A1 * | 10/2003 | Ford et al. | 707/3 |
| 2004/0172415 | A1 * | 9/2004 | Messina et al. | 707/104.1 |
| 2004/0215607 | A1 * | 10/2004 | Travis, Jr. | 707/3 |
| 2008/0114729 | A1 * | 5/2008 | Raman et al. | 707/3 |
| 2009/0037412 | A1 * | 2/2009 | Bard et al. | 707/5 |
| 2009/0043797 | A1 * | 2/2009 | Dorie et al. | 707/101 |

OTHER PUBLICATIONS

Page, Lawrence, et al., "The PageRank citation ranking: Bridging order to the web," Technical Report, Stanford Digital Library Technologies Project, 1998, Paper SIDL-WP-1999-0120, pp. 1-17.*

Upstill, Trystan, "Document ranking using web evidence," Thesis document, The Australian National University, Aug. 2005, pp. 1-244.*

Schlieder, Torsten, et al, "Result Ranking for Structured Queries against XML Documents," DELOS Workshop on Information Seeking, Searching and Querying in Digital Libraries, 2000, pp. 1-6.*

Zitt, Michael and Bassecoulard, Elise, "Delineating complex scientific fields by an hybrid lexical-citation method: An Application of nanosciences," Dec. 2006, Information Processing & Management, vol. 43, Issue 6, pp. 1513-1531.*

Garfield, Eugene, et al., "Mapping Output of Topical Searches in the Science Citation Index, Social Science Citation Index, Arts and Humanities Citation Index," Jun. 10, 2003, University of Pennsylvania, pp. 1-30.*

Ratprasartporn, Nattakarn, "Context-based Publication Search Paradigm in Literature Digital Libraries," Jan. 2008, Department of Eletrical Engineering and Computer Science, Case Western Reserve University, pp. 1-151.*

Brin, et al., The Anatomy of a Large-Scale Hypertextual Web Search Engine, Computer Science Department, Stanford University, Stanford, CA 94305, USA, pp. 1-20, Apr. 1, 1998.

* cited by examiner

*Primary Examiner* — Farhan Syed
(74) *Attorney, Agent, or Firm* — Fish & Richardson P.C.

(57) ABSTRACT

Methods, systems, and apparatus, including computer program products are provided for responding to search queries having results that identify books. In one aspect, a search query and multiple web pages that satisfy the search query and have a ranked order as responses to the search query are received. A subset of web pages that are each a reference page for a respective book are selected. A web page is a reference page for a book when the web page includes a reference to the book and satisfies a citation criterion for the book. A book score is assigned to each of the books for which there is at least one reference page in the group of highest ranking web pages. The book scores are used to select one or more of the books. A book reference is generated for each of the books and the book references are provided in response to the search query.

15 Claims, 5 Drawing Sheets

INFORMATIONAL BOOK QUERY

BACKGROUND

This specification relates to digital information retrieval, and particularly to processing search results relating to books.

The Internet enables access to a wide variety of content items, e.g., video or audio files, web pages for particular subjects, book articles, or news articles. A search engine can identify content items in response to a user query that includes one or more search terms or phrases, and provide links to the identified content items in the form of search results. One example search engine is the Google™ search engine provided by Google Inc. of Mountain View, Calif., U.S.A.

In some cases, user queries identify authors or books. For example, users may submit search queries including an author's name or a book title. The search engine can classify these queries as author queries or book queries, respectively. For author queries, the search engine can identify books written by the author and provide search results that link to web pages that include scanned pages of the books. For book queries for a particular book, the search engine can provide a search result that links to a web page that includes scanned pages of the particular book. The search engine can display these search results prominently above other search results generated in response to the query.

Often times, however, the query does not include exact words for titles of books or an author's name, but instead may describe a particular subject. For such queries, the user may benefit from a list of books from which the user might find useful information for the particular subject.

SUMMARY

In general, one aspect of the subject matter described in this specification can be embodied in methods that include the actions receiving in a computer system a search query and multiple web pages that are responsive to the search query and have a ranked order as responses to the search query; selecting, from among a group of highest ranking web pages, a subset of web pages that are each a reference page for a respective book, where a particular web page is determined to be a reference page for a particular book when the web page includes a reference to the particular book and satisfies a citation criterion for the particular book; assigning a book score to each of the books for which there is at least one reference page in the group of highest ranking web pages, where each of the reference pages referencing a respective book contributes to the book score for the respective book; using the book scores to select one or more of the books; generating a book reference for each of the one or more books; and providing the book references in response to the search query. Other embodiments of this aspect include corresponding systems, apparatus, and computer program products.

Particular embodiments of the subject matter described in this specification can be implemented so as to realize one or more of the following advantages. Search results for a list of books that are likely to be of interest to a user can be identified from queries that do not include specific book titles or authors. These search results can be prominently presented to the user, for example, in a display area separate from the area where other search results are displayed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
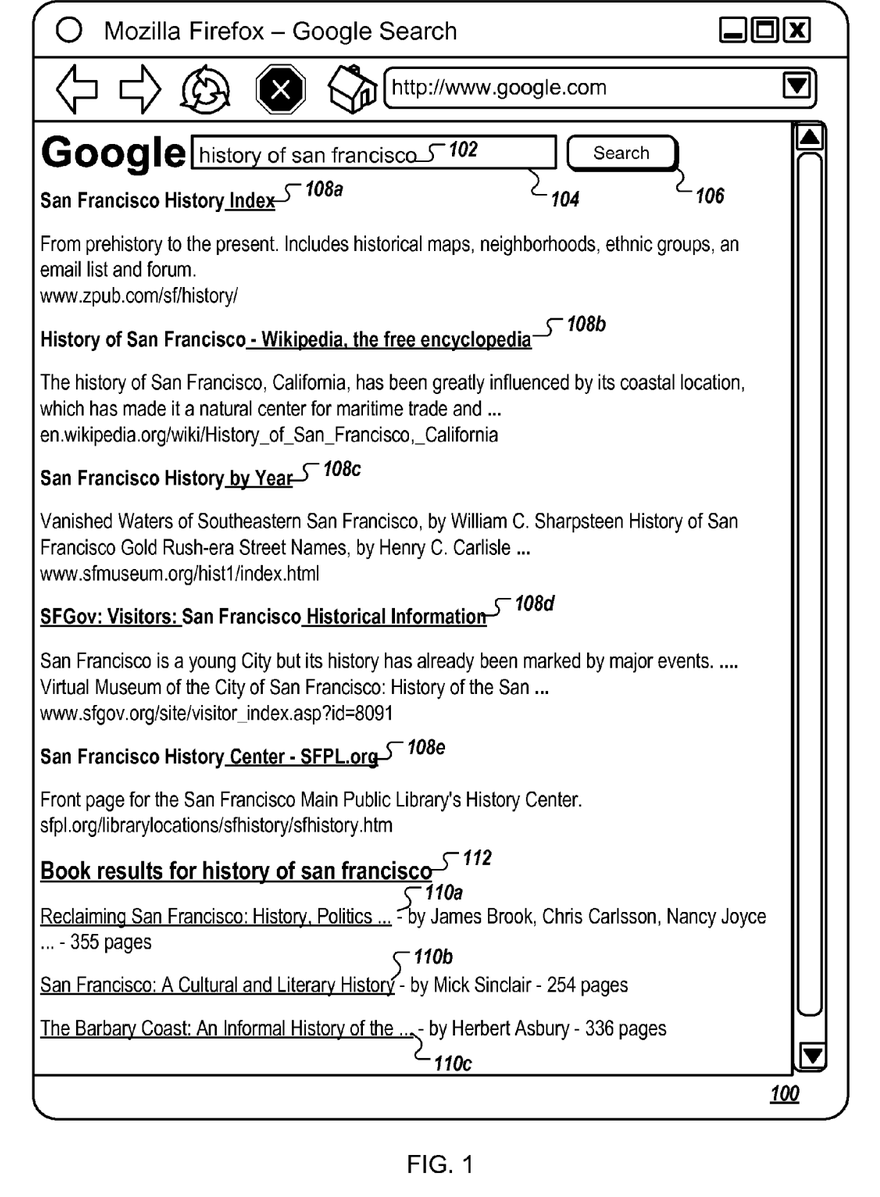
FIG. 1 is a screen shot of an example web browser page displaying search results responsive to a search query.

FIG. 1 is a screen shot of an example web browser page 100 displaying search results in response to a search query 102. The search query 102, entered into a query box 104, includes search string "history of san francisco." A user can submit the search query 102 to a search engine by selecting the search button 106.

In response to receiving the search query 102, the search engine generates search results each of which includes a URL link and a snippet of the resource that the link points to. The search results link to web content items that are determined by the search engine to be responsive to the search query 102. The search engine returns the search results to the web browser. Search results generated in response to the search query 102 include web content references and the book references. As shown, the example web browser page 100 illustrates a web page generated in response to the search query 102, and the search results include web content references 108a-e and book references 110a-c. For convenience, the term "web content reference" in this specification will exclude search results that are "book content references". How particular search results are classified as being book references will be described later in this specification. The web content references identify web content items such as web pages or documents responsive to the search query 102. The web content items, for example, may be related to articles, discussion threads, music, video, graphics, other web page listings, information feeds, product reviews, and web pages including full text of periodicals, newspapers, books, and magazines. The web content references can, for example, include a title of the web content item, a brief summary of the contents of the web content item or a snippet of content extracted from the web content item, a thumbnail image of the web content item, and the universal resource locator (URL) of the web content item, some or all of which can serve as a link to the web content item.

Each book reference identifies a book. Generation of the book references is explained in greater detail below.

Book references include citation information, e.g., the title, subtitle, author, publication date, publishing company, number of pages, ISBN, a brief summary of the contents of the publication, a thumbnail image of the cover of the publication, or the universal resource locator (URL) of a location at which the reader can read, preview, or purchase the book.

In some implementations, if the book is available in a web readable format (e.g., scanned and uploaded in preview portions or in its entirety), the book reference can include a link to a specific page in the book. For example, a book reference provided in response to the query "machine learning" can include a link to a cover page of a scanned book relating to the subject of machine learning.

In some implementations, the book references are displayed distinctively. A distinctively displayed book reference is a book reference that is displayed in a format that is visibly distinguished from the format of the web content references. For example, book references can be distinctively displayed by displaying them prominently within a separate information area toward the top of the web browser page 100, such as the book results section 112, or within a separate presentation pane (e.g., browser window, browser tab, or pop-up window). In other implementations, the book references are displayed among the web content references (e.g., sorted by rank or alphabetical order) and are displayed distinctively by use of a book icon in the book reference.

In some implementations, the book references are generated by the search engine based upon citation information included in one or more of the content items referenced by the web content references. Generation of the book references is explained in greater detail below.

Figure 2:
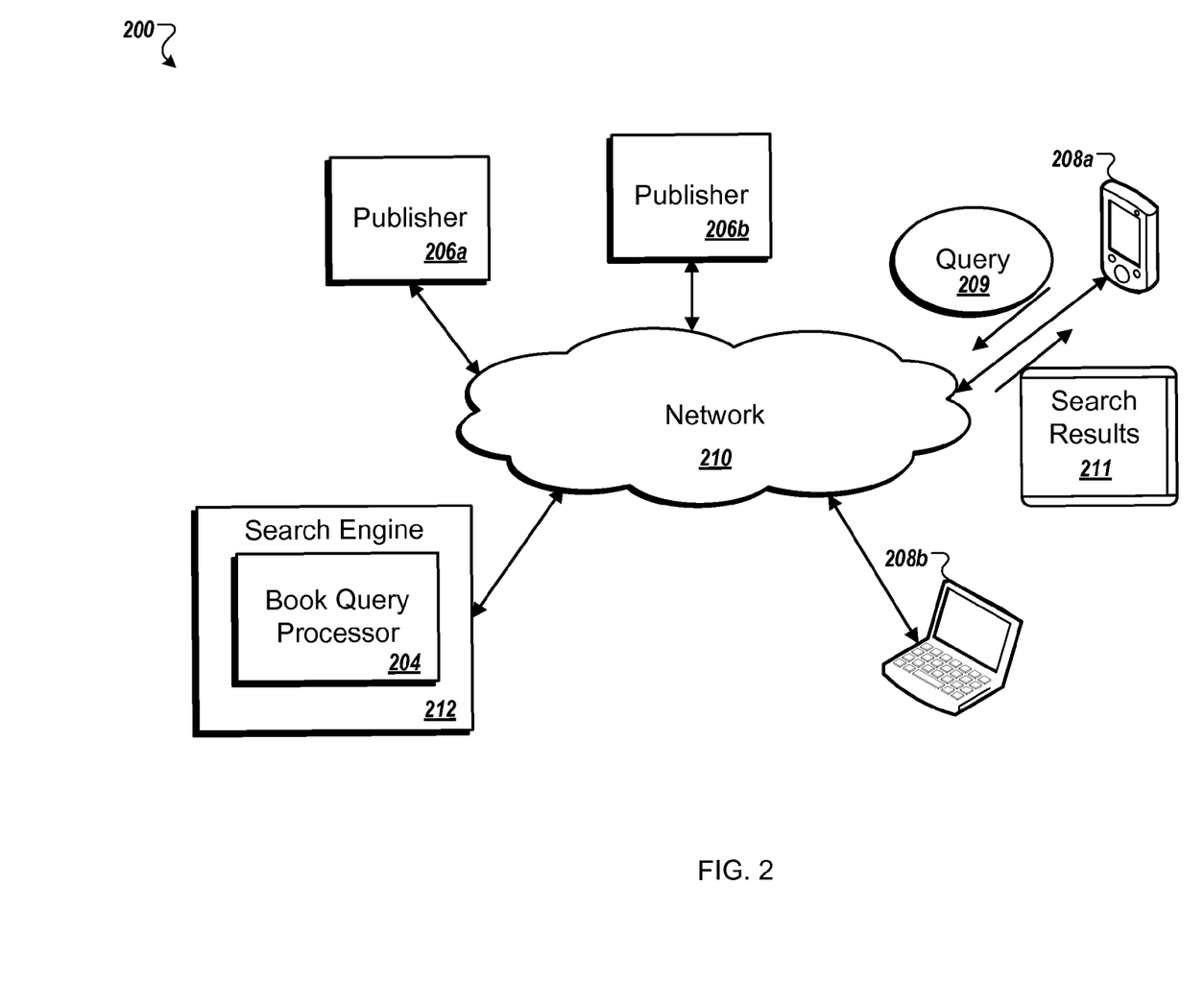
FIG. 2 is a block diagram of an example online environment.

FIG. 2 is a block diagram of an example online environment 200. The online environment 200 can facilitate the identification and serving of content items (e.g., web pages, images, video, audio, or advertisements) to users. The online environment 200 can, for example, be used to provide a user with the search results displayed within the web browser page 100 of FIG. 1. A computer network 210, such as a local area network (LAN), wide area network (WAN), the Internet, or a combination thereof, connects a search engine 212, publishers 206a and 206b, and user devices 208a and 208b. Example user devices 208 include personal computers, mobile communication devices, and television set-top boxes. Although only two publishers (206a and 206b) and two user devices (208a and 208b) are shown, the online environment 200 may include many thousands of publishers and user devices.

The publishers can be general content servers that receive requests for content and retrieve the requested content in response to the request. For example, content servers related to news content providers, retailers, independent blogs, social network sites, products for sale such as copies of portions of books or entire books or any other entity that provides content over the network 210 can be publishers.

A user device, such as user device 208a, can submit a search query 209 to the search engine 212, and search results 211 can be provided to the user device 208a in response to the search query 209. The search results 211 can include web content references that link to web pages of the publishers, and can also include book references that link to web pages including book content. The web pages containing book content can include, for example, the actual content of the books, such as scanned pages of the books, that are hosted and provided by one or more publishers 206.

To facilitate generation of the search results responsive to queries, the search engine 212 can index the content provided by the publishers 206 (e.g., an index of web pages) for later search and identification of content items that are responsive to the queries. An exemplary search engine 212 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number (e.g., ten) of search results. The search results are ranked based on scores related to the content items identified by the search results, such as information retrieval ("IR") scores, and optionally a separate ranking of each document relative to other documents ("page rank"). In some implementations, the IR scores are computed from dot products of feature vectors corresponding to a query and a content item, and the ranking of the search results is based on relevance scores that are a combination of the IR scores and page rank scores.

A user of a user device 208 may input a search query 209 related to a particular subject for which there are many books that may be of interest to the user. However, the search query 209 may not contain exact words for titles of books or an author's complete name, but instead may just describe the particular subject. For these queries, the user may benefit from a list of books from which the user might find useful information for the particular subject.

Thus, in some implementations, the search engine 212 includes a book query processor 204. The book query processor 204 can process the content items identified by the web content results and determine which, if any, of the content items references a book. For those that are determined to reference books, the relevance of the content items to the query 209 can be used to determine whether book references for the books should be generated. Book references, if any, are provided with the search results.

In some implementations, the user is provided the option to select whether or not to receive book references within the search results 211. For example, the search engine user interface page can present an interactive option (e.g., radio button or check box) for selecting whether or not the search results 211 will include book references. In some implementations, the search results 211 can contain a link that when selected causes a display of a listing of book references responsive to the search query 209. The user can select the link to view the list of book references which are responsive to the search query 209.

Figure 3:
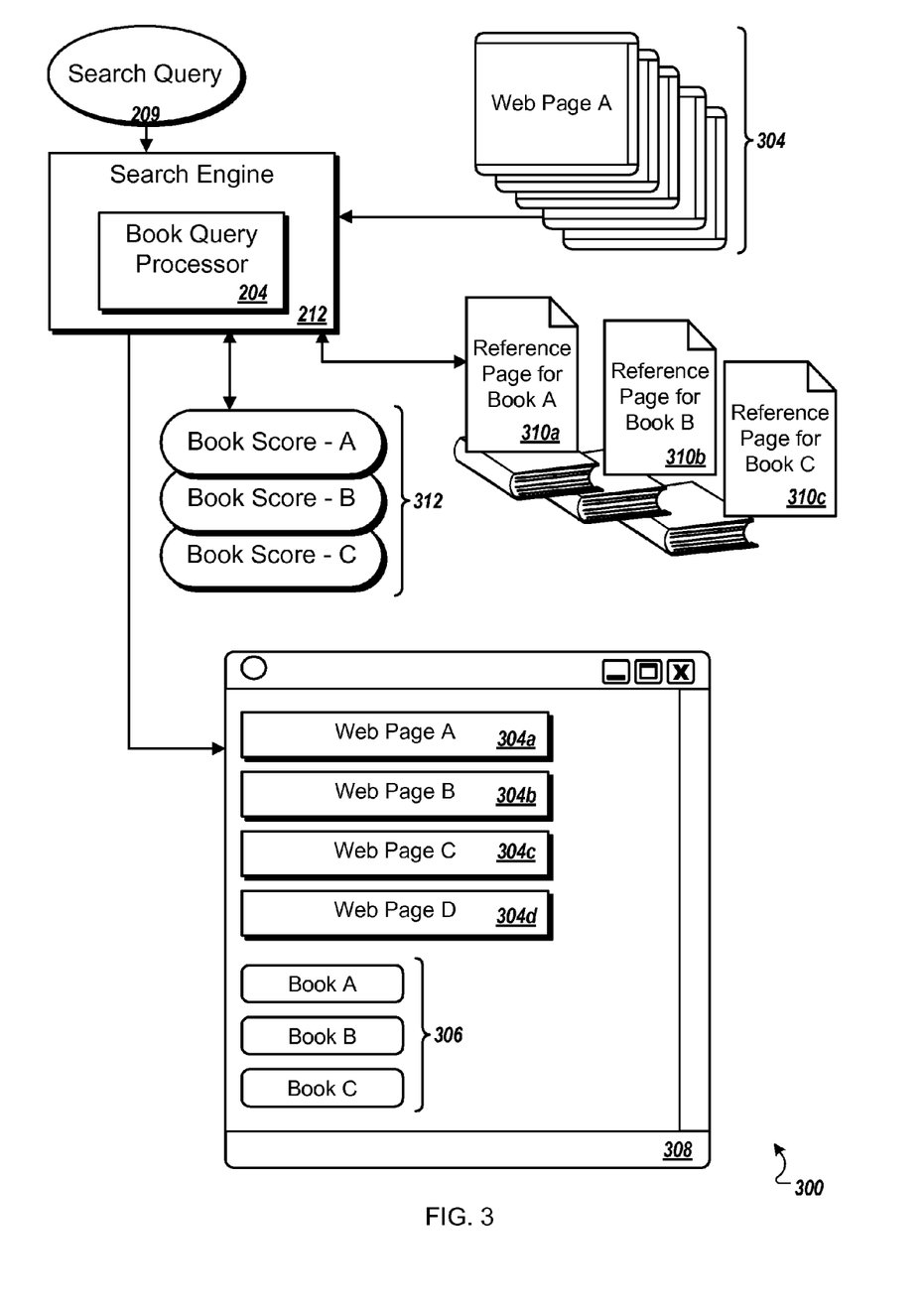
FIG. 3 is a block diagram of an example system for generating book references responsive to a search query.

FIG. 3 is a block diagram of an example system 300 for generating book references 306 responsive to a search query 209. Upon receiving a search query 209, the search engine 212 identifies web pages 304 that it determines match or is responsive to the search query 209. The search engine 212 can apply one or more relevance metrics such as information retrieval (IR) scores that measure the relevance of the search query 209 to readable text in each web page 304, anchor text (AT) scores that measure the relevance of the search query 209 to hypertext in each web page 304, or page rank scores that measure the popularity of each web page 304 in the context of the historical performance of the same search query 209 or a similar query. The search engine 212 ranks the web pages 304 based in part upon the relevance metric values for each web page 304.

In some implementations, the book query processor 204 identifies a subset of the highest ranking web pages 304, such as the top 60 ranked web pages 304, and from this subset identifies those web pages 304, if any, that are book reference pages 310a, 310b, and 310c for respective books.

In some implementations, a web page 304 is determined to be a book reference page 310a, 310b, or 310c for a book if the web page satisfies a citation criterion for the book. A citation criterion can be satisfied, for example, if a citation score of a web page for a book exceeds a citation threshold.

To calculate a citation score of a web page for a book, the book query processor 204 first determines if the web page cites to a book. A web page can cite to a book if the web page, for example, includes a reference to the book, such as the book title and, optionally, the author of the book. In some implementations, the book query processor 204 has access to a library data store that stores book metadata for many published books, including book titles, author names, ISBN numbers, year published, and other such information. This information from the library data store can be compared to content of the web page to identify any book citations in the web page.

The book query processor 204 can generate a citation score for each book cited within the web page 304 by calculating a relevance metric of the book metadata in relation to the contents of the web page 304. For example, upon finding a book citation, the book query processor 204 can access book metadata for the book and compare the book metadata to the content of the web page 304 to generate a citation score for the web page 304 and the book.

The citation score, in some implementations, is a measure of the relevance of the book metadata to the content of the web page. In some implementations, book metadata for a book cited on a web page 304 is searched on web page 304 to generate the citation score. For example, the book query processor 204 can submit the book metadata as a query for the web page to the search engine 212 and an IR score for the web page can be generated by the search engine 212. The citation score for the web page for that book is then set to this IR score.

After citations scores are determined, the book query processor 204 determines whether the citation score for a web page and a book satisfies a citation criterion. In some implementations, the citation score of a particular book referenced within a web page 304 satisfies the citation criterion when the citation score of the web page for the particular book exceeds a citation threshold, and when citation scores of the web page for any other books referenced on the web page are each less than the citation score for the particular book. In some implementations, a citation score can satisfy the citation criterion if the citation score for a particular book is at least a predetermined percentage greater than the citation scores for the other books cited within the same web page (e.g., at least two times greater). In other implementations, the citation score for the particular book can be determined to exceed a citation threshold when the citation score for the book is an absolute value greater than the citation score of any other book identified within the web page.

If a citation score for a particular book cited on a web page 304 is determined to satisfy the citation criteria, then the web page 304 is determined to be a reference page 310a, 310b, or 310c for the particular book.

In some implementations, the book query processor 204 processes web pages 304 off line. As the determination of whether to classify a web page 304 as a reference page 310a, 310b or 310c for a book is independent of a user query, the pre-processing of web pages 304 to identify reference pages 310a, 310b, and 310c for books can improve performance at query time and conserve query time processing resources. For example, web pages 304 that have been crawled and stored in a search engine 212 cache can be searched for book citations. For those web pages 304 in which book citations are found, citation scores can be generated. For those web pages having citation scores that are determined to satisfy the citation criterion, the citation scores can be pre-associated with the web pages 304 and the books. These web pages 304, in turn, can be classified as reference pages 310a, 310b, and 310c for the cited books.

In other implementations, the book query processor 204 can process the web pages 304 as described above to identify which to classify as reference pages 310a, 310b, and 310c at query time.

Using the highest ranking web pages 304 that are also classified as reference pages 310a, 310b, and 310c for cited books, the book query processor 204 assigns a book score 312 to each of the cited books. In some implementations, the book score 312 for a particular book can be based on a relevance score of a reference page 310a, 310b, or 310c and the citation score of the book. In some implementations, the relevance score of the reference page 310a, 310b, or 310c can be proportional to the rank of the reference page 310a, 310b, or 310c in the search results. In some implementations, the relevance score of the reference page 310a, 310b, or 310c can be based on the search query 209, and the citation score of the book for the reference page 310a, 310b, or 310c can be combined with it to generate the book score 312. The combination can be a multiplication of the two values, or can be based on some other function.

In some implementations, the number of times the same book is referenced within the reference pages 310a, 310b, and 310c of the search results can be used in determining the book score 312. For example, if the same book is determined to be referenced by three reference pages 310a, 310b, and 310c, the citation scores for those three reference pages 310a, 310b, and 310c can be summed to generate a book score 312 for the book. Other aggregation functions can also be used.

The books are then ranked by the book query processor 204 based on these scores, and the book query processor 204 selects the top ranked books and generates book references 306 for the top ranked books. In some implementations, a subset of the top ranked books, e.g., the top three ranked books, are selected for the generation of book references 306.

The search engine 212 can, for example, rank the book references 306 for presentation according to the ranking determined by the book query processor 204. The book references 306 can also be ranked by other techniques, such as alphabetically by title, author, or publication date, for example.

In some implementations, the book query processor 204 selects the subset of top ranking books, in part, based upon a performance metric between the book metadata of each book and the search query 302. For example, the book query processor 204 filters the books by determining a correspondence of the search query 302 to the books' metadata. The correspondence can, for example, be determined from an overlapping ratio of the books' metadata to the search query 302. The overlapping ratio can be used to generate a relevancy score that measures the relevance of the search query 302 to book metadata associated with the book, and a corresponding book reference 306 is selected only if the relevancy score exceeds a threshold. Other ways of determining a correspondence of the search query 302 to the books' metadata can be used.

In some implementations, only a set or limited number of top ranking books with the greatest overlap in ratio of metadata to the search query 302 (e.g., three books or no more than three books) is presented within the search results.

In some implementations, the relevancy score for each book can be multiplied by the book score for the book and the resulting score can be used to rank and select corresponding books.

The filtering is used to preclude the presentation of book references 306 when there is little or no overlap between the query terms and the book metadata. Sufficient overlap between the book metadata and the search query 302 indicates that the book may have information relevant to the query. Conversely, the lack of such overlap can be interpreted as indicating that the books do not have information relevant the query, and thus the presentation of book references 306 may not enrich the user experience. For example, the query "machine learning" can result in several book references 306 that include the phrase "machine learning" in the title. Conversely, the query "training computers from test and training sets" is a query that may result the identification of web pages 304 that are reference pages 310*a*, 310*b*, or 310*c*, but the books referenced by those pages may not have any of the query terms in their metadata, or have very little overlap with the query. Accordingly, the query is determined to be too vague with respect to the book metadata for the book to be represented by book references 306.

As illustrated, the book references 306 are displayed within the browser window 308 beneath the web page references 314. In other implementations, the book references 306 can be displayed among the web page references 314 (e.g., based upon book score), within a separate display pane of the browser page 308, or within a pop-up window of the browser.

Figure 4:
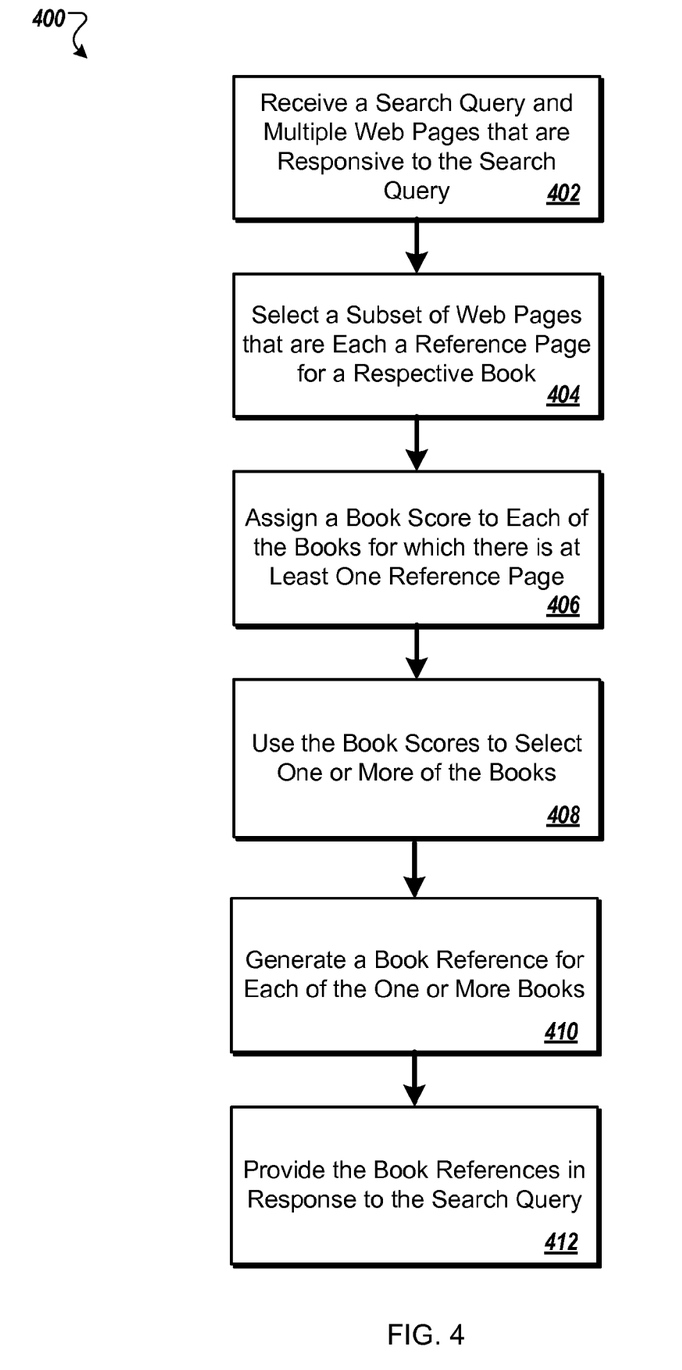
FIG. 4 is a flow diagram of an exemplary process for generating book references responsive to a search query.

FIG. 4 is a flow diagram of an exemplary process 400 for generating book references responsive to a search query.

A search query and multiple web pages that are responsive to the search query are received (402). The web pages have a ranked order based on the search query. For example, the search engine 212 can receive the search query 209 and identify the web pages 304. The search query 209 and the web pages 304 are provided to the book query processor 204.

A subset of web pages that are each a reference page for a respective book is selected (404). For example, the book query processor 204 selects the reference pages 310*a*, 310*b*, or 310*c* by accessing pre-associated citation scores that have been determined to satisfy a citation criterion, or by identifying citations to books in the web pages, generating citation scores for those cited books and web pages, and determining if the citation scores satisfy a citation criterion.

A book score is assigned to each of the books for which there is at least one reference page in the group of highest ranking web pages, where each of the reference pages referencing a respective book contributes to the book score for the respective book (406). The book query processor 204 can, for example, assign the book scores 312 to each of the books.

The book scores are used to select one or more of the books. (408). For example, the book query processor 204 can select one or more books based on the book score.

A book reference is generated for each of the one or more books (410). For example, the book query processor 204 can generate a book reference for each of the one or more books.

The book references are provided in response to the search query (412). For example, the search engine 212 can provide the book references 306 for display within the browser 308.

Figure 5:
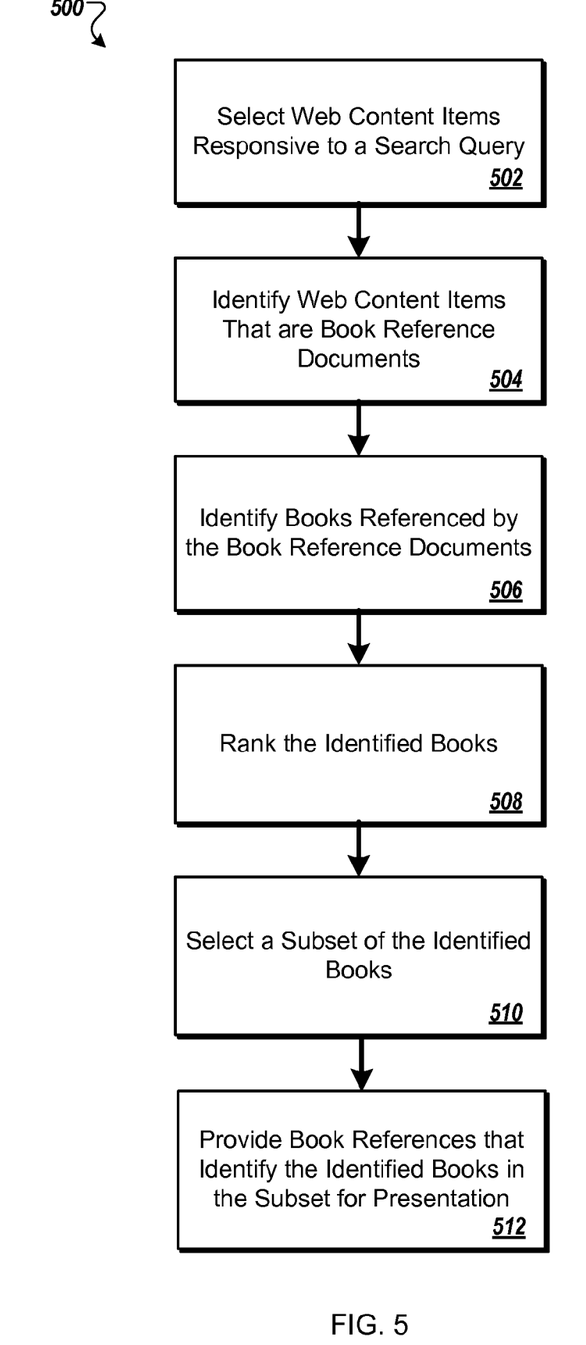
FIG. 5 is a flow diagram of another exemplary process for generating book references responsive to a search query.

FIG. 5 is a flow diagram of another exemplary process 500 for generating book references responsive to a search query.

Web content items responsive to a search query are selected (502) and search results identifying the web content items are generated. Each search result has an associated search score. For example, the search engine 212 selects the web content items and generates the search results identifying the web content items.

Web content items that are book reference documents are identified (504). Each book reference document references a book and has a pre-associated citation score for the referenced book. The web content items are selected from the web content items that are responsive to the search query. Each book referenced by one or more of the book reference documents has a pre-associated citation score. For example, the book query processor 204 identifies web content items that are book reference documents.

Books referenced by the book reference documents are identified (506). Each book reference document includes at least one book associated with the pre-associated citation score. For example, the book query processor 204 identifies books referenced by the book reference documents.

The identified books are ranked based on the pre-associated citation scores for each book reference document and the search score associated with the search results that identify the book reference documents (508). For example, the book query processor 204 ranks the books associated with the book reference documents based on the pre-associated citation scores.

A subset of the identified books is selected, the subset including books that are ranked highest in the ranking of the identified books (510). For example, the book query processor 204 selects the top three ranked books of the identified books.

Book references that identify the identified books in the subset are provided for presentation to a user (512). For example, the search engine 212 provides the book references that identify the identified books in the subset for presentation.

Although only books are discussed above, other printed publications such as magazines, newspapers, or periodicals can be identified.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

A computing system can implemented in a system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving in a computer system a search query;
determining, for each web page in a plurality of web pages that satisfy a search query and have a position in a ranked order of web pages that satisfy the search query, whether the web page is a reference page for a book, wherein a particular web page is determined to be a reference page for a particular book when (i) the web page includes a reference to the particular book and has a citation score that satisfies a citation criterion for the particular book, (ii) a citation score of the web page for the particular book exceeds a citation threshold, and (iii) citation scores of the web page for other books referenced on the web page are each less than the citation score for the particular book, wherein the citation score is a measure of relevance of book metadata for the particular book to content of the web page;
selecting, from among the web pages, a subset of web pages that are each a reference page for a respective book;
assigning a book score to each of the books for which there is at least one reference page in the subset of web pages, where each of the reference pages in the subset referencing a respective book contributes to the book score for the respective book;
selecting one or more of the books based on the book scores;
generating a book reference for each of the one or more books, wherein each book reference includes at least one of citation information of the respective book or a link to a page of the respective book; and
providing, in a response to the search query, the book references in addition to one or more web content references, each web content reference linking to one of the plurality of web pages.

2. The method of claim 1, wherein the citation scores of the web page for other books referenced on the web page are each at least a predetermined percentage less than the citation score for the particular book.

3. The method of claim 2, wherein the particular book and each of the other books are described by respective book metadata.

4. The method of claim 3, wherein the book metadata comprises a title, a subtitle, and an author of the given book.

5. The method of claim 1, wherein providing the book references comprises:
providing the book references in a web page in which the book references will be displayed distinctively from other search results.

6. A system comprising:
one or more computers; and
a computer-readable medium coupled to the one or more computers having instructions stored thereon which, when executed by the one or more computers, cause the one or more computers to perform operations comprising:
receiving in a computer system a search query;
determining, for each web page in a plurality of web pages that satisfy a search query and have a position in a ranked order of web pages that satisfy the search query, whether the web page is a reference page for a book, wherein a particular web page is determined to be a reference page for a particular book when (i) the web page includes a reference to the particular book and has a citation score that satisfies a citation criterion for the particular book, (ii) a citation score of the web page for the particular book exceeds a citation threshold, and (iii) citation scores of the web page for other books referenced on the web page are each less than the citation score for the particular book, wherein the citation score is a measure of relevance of book metadata for the particular book to content of the web page;
selecting, from among the web pages, a subset of web pages that are each a reference page for a respective book;
assigning a book score to each of the books for which there is at least one reference page in the subset of web pages, where each of the reference pages in the subset referencing a respective book contributes to the book score for the respective book;
selecting one or more of the books based on the book scores;
generating a book reference for each of the one or more books, wherein each book reference includes at least one of citation information of the respective book or a link to a page of the respective book; and
providing, in a response to the search query the book references in addition to one or more web content references, each web content reference linking to one of the plurality of web pages.

7. The system of claim 6, wherein the citation scores of the web page for other books referenced on the web page are each at least a predetermined percentage less than the citation score for the particular book.

8. The system of claim 7, wherein the particular book and each of the other books are described by respective book metadata.

9. The system of claim 8, wherein the book metadata comprises a title, a subtitle, and an author of the given book.

10. The system of claim 6, wherein the operations further comprise:
providing the book references in a web page in which the book references will be displayed distinctively from other search results.

11. A computer-readable medium encoded with a computer program comprising instructions that, when executed, operate to cause a computer to perform operations comprising:
receiving in a computer system a search query;
determining, for each web page in a plurality of web pages that satisfy a search query and have a position in a ranked order of web pages that satisfy the search query, whether the web page is a reference page for a book, wherein a particular web page is determined to be a reference page for a particular book when (i) the web page includes a reference to the particular book and has a citation score that satisfies a citation criterion for the particular book, (ii) a citation score of the web page for the particular book exceeds a citation threshold, and (iii) citation scores of the web page for other books referenced on the web page are each less than the citation score for the particular book, wherein the citation score is a measure of relevance of book metadata for the particular book to content of the web page;
selecting, from among the web pages, a subset of web pages that are each a reference page for a respective book;
assigning a book score to each of the books for which there is at least one reference page in the subset of web pages, where each of the reference pages in the subset referencing a respective book contributes to the book score for the respective book;
selecting one or more of the books based on the book scores;
generating a book reference for each of the one or more books, wherein each book reference includes at least one of citation information of the respective book or a link to a page of the respective book; and
providing, in a response to the search query, the book references in addition to one or more web content references, each web content reference linking to one of the plurality of web pages.

12. The computer-readable medium of claim 11, wherein the citation scores of the web page for other books referenced on the web page are each at least a predetermined percentage less than the citation score for the particular book.

13. The computer-readable medium of claim 12, wherein the particular book and each of the other books are described by respective book metadata.

14. The computer-readable medium of claim 13, wherein the book metadata comprises a title, a subtitle, and an author of the given book.

15. The computer-readable medium of claim 11, wherein the operations further comprise:
providing the book references in a web page in which the book references will be displayed distinctively from other search results.

* * * * *

UNITED STATES PATENT AND TRADEMARK OFFICE
CERTIFICATE OF CORRECTION

| | | |
|---|---|---|
| PATENT NO. | : 8,392,429 B1 | Page 1 of 1 |
| APPLICATION NO. | : 12/324731 | |
| DATED | : March 5, 2013 | |
| INVENTOR(S) | : Clancy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this
Thirtieth Day of December, 2014

Michelle K. Lee
*Deputy Director of the United States Patent and Trademark Office*